(No Model.)
A. A. LOW.
COMBINATION POCKET IMPLEMENT.
No. 464,141.            Patented Dec. 1, 1891.
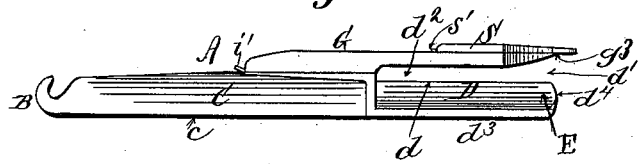
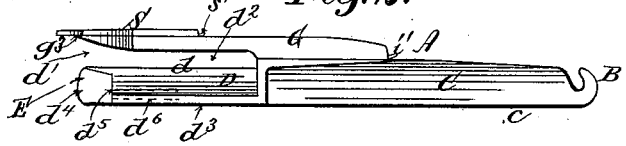
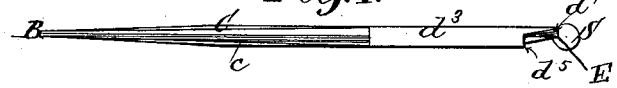
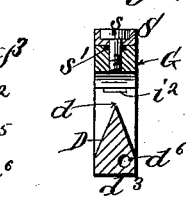
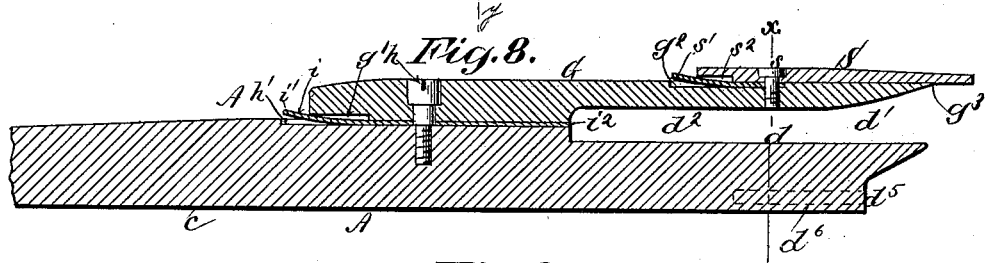
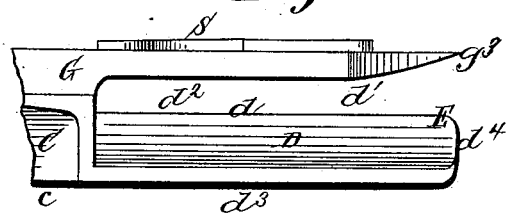
Witnesses:
R. W. Gardner
G. T. Miatt
Inventor:
Abbot Augustus Low
By his Attorney,
George William Miatt

UNITED STATES PATENT OFFICE.

ABBOT AUGUSTUS LOW, OF BROOKLYN, NEW YORK.

COMBINATION POCKET IMPLEMENT.

SPECIFICATION forming part of Letters Patent No. 464,141, dated December 1, 1891.

Application filed July 2, 1891. Serial No. 398,276. (No model.)

*To all whom it may concern:*

Be it known that I, ABBOT AUGUSTUS LOW, a citizen of the United States, residing in the city of Brooklyn, in the county of Kings and State of New York, have invented certain new and useful Improvements in Combination Implements, of which the following is a specification sufficient to enable others skilled in the art to which the invention appertains to make and use the same.

My improvements relate to the class of implements heretofore devised by me, and for which I have made several prior applications for patents, designed to afford a convenient device suitable to be carried in the pocket and capable of use in various ways in connection with ordinary emergencies of daily life, the combined implement being adapted to perform the functions of a button hook or pull, paper-cutter, nail-cleaner, screw-driver, brad, &c., and other implements, according to the requirements of use.

My present improvements relate more especially to the form of implement set forth in my applications, Serial No. 388,224, filed April 9, 1891, and Serial No. 388,452, filed April 11, 1891, in which the cutting-blade is protected by a swinging guard, which is also adapted for use as a nail-cleaner and for analogous uses in which a pointed implement is desirable.

My present invention consists, first, in providing the swinging guard which protects the cutting-blade with a point-protector, which may be turned back out of the way when it is desired to use the point. By this means I not only protect the point more effectually and positively than heretofore, but I am also enabled to extend the pointed end of the guard approximately to or even beyond the end of the cutting-blade and to leave the ends of both open to constitute the entrance to the slot or elongated space between the edge of the said cutting-blade and its parallel guard. By thus leaving the end of the cutting-blade free and open at all times I render it more available and convenient in use, while the parallel guard still protects its cutting-edge from unintentional contact with extraneous objects. In like manner by extending the parallel guard itself I render its point more convenient and effective in use, especially when employed as a brad, scriber, punch, &c.

A second feature of my invention consists in forming the end of the interior cutting-blade so that it may be used as a wedge, screw-driver, &c., the inner cutting-edge extending substantially to the end thereof. This construction also facilitates the insertion of the end of the cutting-blade under a string or cord, as when wrapped tightly around a bundle, for the purpose of severing the same.

In the accompanying drawings, Figure 1 is an elevation of one side of my improved combined implement, and Fig. 2 a similar view of the opposite side thereof. Fig. 3 is an elevation of one edge of the device, and Fig. 4 a similar view of the opposite edge thereof. Fig. 5 is an elevation of the hook end of the implement, and Fig. 6 an end elevation of the opposite end of the device. Fig. 7 is a transverse section upon plane of line $x$ $x$, Fig. 8. Fig. 8 is a longitudinal central section on plane of line $y$ $y$, Fig. 6, of the major portion of the device, the hook end being shown as broken away. Fig. 9 is an elevation of the cutting-blade end of the device, showing the point-guard swung back, exposing the point of the parallel guard ready for use.

The shank A is formed of a single piece of metal, including the hook B, straight-edge and paper-cutter C, cutting-blade D, and combined wedge and screw-driver E.

In all essential respects the construction and arrangement of the body of the implement are substantially the same as in implements of this character heretofore invented by me, especially the form shown in my last two applications hereinbefore referred to.

The hook B is designed as a button or lace-pull hook for shoes and for analogous uses. The adjoining portion C of the shank A is formed with a straight-edge $c$, adapted for use also as a paper-cutter.

The interior blade D is formed in the usual or any convenient manner, except that its outer end is not inclosed, as heretofore. Instead the cutting-edge $d$ extends the whole length of the inner edge of the blade, and a free open entrance $d'$ is left to the longitudinal cutting-slot $d^2$. The blade D is V-shaped in cross-section, its back or spine $d^3$ being comparatively thick to impart strength and rigidity to the blade. I reduce the outer end of the blade D in thickness for a short distance to form the wedge-shaped extremity $d^4$. This leaves a shoulder $d^5$, through which I bore a recess or socket $d^6$, extending longitudinally backward into the spine $d^3$ of the blade. The wedge-shaped end $d^4$ not only permits of the insertion of the end of the blade between bindings, &c., so that they may be severed by the cutting-edge, but also performs the functions of a wedge, screw-driver, &c., as heretofore provided for by me in this class of implements by an enlarged shouldered head upon the end of the blade, the main distinction is this respect in the present case consisting in forming the wedge directly in the end of the blade itself, so that the cutting-edge $d$ may be utilized in conjunction therewith, as above set forth.

I am aware that in a former application, Serial No. 381,158, filed February 12, 1891, I provide the implement with a socket for the reception of detachable tools, &c., and I do not herein seek to cover this feature, broadly, except in combination with the peculiar construction of cutting-blade herein shown and described.

The interior blade D is provided with the parallel guard G, extending substantially the full length of the cutting-blade and beyond the end thereof, if preferred. This guard G may be made solid and rigid with the body A of the implement, if desired, although I prefer to employ the form of pivoted swinging guide hereinbefore referred to as forming the subject-matter of prior applications. Thus, in order that the guard G may be swung out of the way when it is desired to employ the cutting-edge $d$ of the blade D for cutting in any of the various uses to which the blades of pocket-knives are ordinarily applied, I pivot the said guard G at $h$ to the edge of the shank A. A groove $h'$ is formed in the edge of the shank A, in which a double-ended spring $i$ is situated, both ends $i'$ $i^2$ projecting, when free, slightly beyond the edges of the groove $h'$. A corresponding groove $g'$ is formed in the under side of the guard G at its rear extremity, into which either one end or the other of the spring $i$ snaps when the guard is turned parallel to the shank in either one direction or the other, as the case may be, as fully illustrated and described in my application for patent last recited hereinbefore.

The point-shield consists of a movable section S, which may be adjusted over or retracted from the point $g^3$ of the guard G. This adjustment or retraction may be provided for in various ways, as by making the section S to slide back and forth longitudinally upon the outer edge of the guard and to be held stationary in either position by a set-screw or equivalent device. I prefer, however, to employ the construction shown in the drawings, in which the section or shield S is pivoted to the outer edge of the guard G adjoining its point by a screw $s$, the head of which is countersunk within the body of the shield S. A recess $g^2$ under the shield S contains a spring $s'$, the end of which engages with a corresponding recess $s^2$, formed in the under side of the shield S, when the latter is adjusted to shield the point $g^3$ of the guard G. The outer end of the shield S is preferably formed with a disk-shaped extension or with other suitable configuration adapted to shield the point $g^3$.

What I claim as my invention, and desire to secure by Letters Patent, is—

1. In an implement substantially such as described, the combination, with the shank A, of the pointed arm G, adapted for use as a nail-cleaner and for analogous uses, and the extension-piece S, attached to the pointed arm G in such manner that it may be adjusted over or away from the point of the arm G, substantially in the manner and for the purpose described.

2. In an implement substantially such as herein shown, the combination, with the shank A, of the pointed arm G, pivotally attached to the shank A and adapted for use as a nail-cleaner and for analogous uses, and the extension-piece S, pivotally attached to the said arm G and adapted to be swung over or away from the point of the said arm G, for the purpose and substantially in the manner described.

3. In an implement substantially such as described, the combination, with the shank A and pointed arm G, formed with the recess $g^2$, of the swinging shield S, pivot $s$, and spring $s'$, the whole arranged and operating substantially in the manner and for the purpose described.

4. In an implement substantially such as described, the combination of the shank A with the interior cutting blade or arm D, formed with its cutting-edge $d$ extending the whole length of said arm D and formed with the shoulder $d^5$ and socket $d^6$, the portion C, formed with the cutting-edge $c$ and hook B, and the pointed arm G and swinging guard S, the whole constructed and arranged substantially in the manner and for the purpose described.

ABBOT AUGUSTUS LOW.

Witnesses:
GEORGE WILLIAM MIATT,
D. W. GARDNER.